(12) United States Patent
Mohammed et al.

(10) Patent No.: US 11,228,637 B2
(45) Date of Patent: Jan. 18, 2022

(54) CLOUD COMPUTING ABSTRACTION LAYER FOR INTEGRATING MOBILE PLATFORMS

(71) Applicant: VMware, Inc., Palo Alto, CA (US)

(72) Inventors: Intesar Mohammed, Santa Clara, CA (US); Rakesh Sinha, Sunnyvale, CA (US); Nikunj Nemani, Sunnyvale, CA (US); Assaf Berg, San Francisco, CA (US); Vishwas Nagaraja, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 99 days.

(21) Appl. No.: 14/316,507

(22) Filed: Jun. 26, 2014

(65) Prior Publication Data

US 2015/0381550 A1    Dec. 31, 2015

(51) Int. Cl.
*H04L 29/08* (2006.01)
*H04L 12/58* (2006.01)
(Continued)

(52) U.S. Cl.
CPC ............ *H04L 67/10* (2013.01); *G06Q 50/01* (2013.01); *H04L 41/18* (2013.01); *H04L 51/18* (2013.01);
(Continued)

(58) Field of Classification Search
CPC ........ G06F 9/4445; H04L 51/32; H04L 67/10
See application file for complete search history.

(56) References Cited

U.S. PATENT DOCUMENTS

| 4,975,836 A | 12/1990 | Hirosawa et al. |
| 6,691,113 B1 | 2/2004 | Harrison et al. |
| (Continued) | | |

FOREIGN PATENT DOCUMENTS

| CN | 102057355 A | 5/2011 |
| CN | 102681899 A | 9/2012 |
| (Continued) | | |

OTHER PUBLICATIONS

International Search Report and Written Opinion PCT/2015/032924, dated Dec. 31, 2015, Consists of 12 pages.
(Continued)

*Primary Examiner* — Joe Chacko
(74) *Attorney, Agent, or Firm* — Patterson & Sheridan, LLP

(57) ABSTRACT

A system for managing a virtualized computing system is disclosed. The system enables a user of a mobile device to efficiently track and manage computing resources via a management application that includes a graphical user interface that is designed to be operated using a conventional terminal (e.g., via a mouse and keyboard). The system may receive commands from the user of the mobile device in a first format and translate the commands into a second format that can be executed by a management application. Embodiments of the present disclosure further enable a management application to verify and securely communicate with users via existing communications services (e.g., social networking services) without expending additional resources to develop custom, secure interfaces for multiple mobile software and hardware platforms.

16 Claims, 4 Drawing Sheets

(51) Int. Cl.
*H04L 29/06* (2006.01)
*G06Q 50/00* (2012.01)
*H04L 12/24* (2006.01)
*G06F 9/451* (2018.01)

(52) U.S. Cl.
CPC ............ *H04L 63/101* (2013.01); *G06F 9/452* (2018.02); *H04L 41/5096* (2013.01)

(56) References Cited

U.S. PATENT DOCUMENTS

| | | | |
|---|---|---|---|
| 6,971,090 B1* | 11/2005 | Gruttadauria | G06F 9/54 709/203 |
| 7,068,680 B1* | 6/2006 | Kaltenmark | H04L 67/14 370/469 |
| 7,549,149 B2 | 6/2009 | Childress et al. | |
| 8,171,470 B2 | 5/2012 | Goldman et al. | |
| 8,495,611 B2 | 7/2013 | McCarthy et al. | |
| 8,732,699 B1 | 5/2014 | Hyser et al. | |
| 8,782,744 B1 | 7/2014 | Fuller et al. | |
| 9,081,747 B1 | 7/2015 | Tabieros et al. | |
| 2002/0129242 A1 | 9/2002 | Abbott | |
| 2003/0163686 A1 | 8/2003 | Ward et al. | |
| 2006/0085785 A1 | 4/2006 | Garrett | |
| 2007/0168656 A1 | 7/2007 | Paganetti et al. | |
| 2008/0114984 A1 | 5/2008 | Srinivasan et al. | |
| 2008/0163171 A1 | 7/2008 | Chess et al. | |
| 2008/0250407 A1 | 10/2008 | Dadhia et al. | |
| 2010/0049968 A1 | 2/2010 | Dimitrakos et al. | |
| 2010/0138823 A1 | 6/2010 | Thornley | |
| 2010/0205205 A1 | 8/2010 | Hamel | |
| 2011/0154320 A1 | 6/2011 | Verma | |
| 2011/0209140 A1 | 8/2011 | Scheidel et al. | |
| 2011/0265164 A1* | 10/2011 | Lucovsky | G06F 9/45533 726/7 |
| 2011/0265168 A1 | 10/2011 | Lucovsky et al. | |
| 2011/0295987 A1* | 12/2011 | Petushkov | H04L 41/0226 709/223 |
| 2011/0296021 A1 | 12/2011 | Dorai et al. | |
| 2012/0054280 A1* | 3/2012 | Shah | G06F 9/5072 709/205 |
| 2012/0054736 A1 | 3/2012 | Arcese et al. | |
| 2012/0066674 A1 | 3/2012 | Xie | |
| 2012/0170726 A1 | 7/2012 | Schwartz | |
| 2012/0179822 A1* | 7/2012 | Grigsby | G06F 9/5072 709/226 |
| 2012/0198438 A1 | 8/2012 | Auer | |
| 2012/0221726 A1 | 8/2012 | Nguyen | |
| 2012/0240112 A1 | 9/2012 | Nishiguchi et al. | |
| 2013/0103837 A1* | 4/2013 | Krueger | G06F 9/5072 709/226 |
| 2013/0191528 A1 | 7/2013 | Heninger et al. | |
| 2013/0227091 A1 | 8/2013 | Tompkins | |
| 2013/0227560 A1 | 8/2013 | McGrath et al. | |
| 2013/0232463 A1 | 9/2013 | Nagaraja et al. | |
| 2013/0232480 A1 | 9/2013 | Winterfeldt et al. | |
| 2013/0232497 A1* | 9/2013 | Jalagam | G06F 9/5072 718/104 |
| 2013/0232498 A1* | 9/2013 | Mangtani | G06F 9/5072 718/104 |
| 2013/0263209 A1* | 10/2013 | Panuganty | H04L 43/04 726/1 |
| 2013/0268674 A1 | 10/2013 | Bailey et al. | |
| 2013/0297964 A1 | 11/2013 | Hegdal et al. | |
| 2013/0325885 A1 | 12/2013 | Levy et al. | |
| 2014/0013315 A1 | 1/2014 | Genevski et al. | |
| 2014/0019538 A1* | 1/2014 | Limpaecher | G06Q 50/01 709/204 |
| 2014/0019621 A1 | 1/2014 | Khan et al. | |
| 2014/0033200 A1* | 1/2014 | Tompkins | H04L 63/061 718/1 |
| 2014/0082166 A1* | 3/2014 | Robinson | G06F 9/5072 709/223 |
| 2014/0101318 A1 | 4/2014 | Ferris et al. | |
| 2014/0137111 A1 | 5/2014 | Dees, Jr. et al. | |
| 2014/0201218 A1 | 7/2014 | Catalano et al. | |
| 2014/0201345 A1* | 7/2014 | Abuelsaad | H04L 41/5067 709/223 |
| 2014/0215049 A1 | 7/2014 | Provaznik | |
| 2014/0279201 A1 | 9/2014 | Iyoob et al. | |
| 2014/0280975 A1 | 9/2014 | Mordani et al. | |
| 2014/0325068 A1* | 10/2014 | Assuncao | H04L 41/082 709/226 |
| 2014/0365662 A1 | 12/2014 | Dave et al. | |
| 2015/0163288 A1 | 6/2015 | Maes et al. | |
| 2015/0347264 A1 | 12/2015 | Mohammed et al. | |
| 2015/0350101 A1 | 12/2015 | Sinha et al. | |

FOREIGN PATENT DOCUMENTS

| | | |
|---|---|---|
| CN | 103544043 A | 1/2014 |
| CN | 103797426 A | 5/2014 |
| EP | 2383652 A1 | 11/2011 |
| KR | 2012-0013074 A | 2/2012 |
| WO | 2012033485 A1 | 3/2012 |
| WO | 2013104217 A1 | 7/2013 |
| WO | 2013184134 A1 | 12/2013 |

OTHER PUBLICATIONS

Chieu, "Solution-based Deployment of Complex Application Services on a Cloud", Jul. 2010, pp. 282-287.
U.S. Appl. No. 14/289,231, Office Action dated Dec. 1, 2016.
U.S. Appl. No. 14/292,296, Final Office Action dated Dec. 1, 2016.
U.S. Appl. No. 14/316,517, Final Office Action dated Oct. 11, 2016.
China Office Action Application No. 201580035775.5, dated Sep. 15, 2017 consist os 17 pages with English Translation.
European Search Report Application No. 15800625.4, dated Feb. 8, 2018. Consists of 10 pages.
Examination Report dated Dec. 13, 2018 for European Application No. 15800625.4.
European Search Report Application No. 15800054.7, dated Jul. 3, 2018. Consists of 8 pages.
International Search Report and Written Opinion PCT/US2015/033044, dated Jul. 9, 2015, Consists of 9 pages.
International Search Report and Written Opinion PCT/US2015/033394, dated Jul. 21, 2015, Consists of 9 pages.
International Search Report and Written Opinion PCT/US2015/032625, dated Jul. 7, 2015, Consists of 9 pages.
Communication under Article 94(3) of EP Application No. 15800625.4, dated Apr. 22, 2021.
U.S. Appl. No. 14/287,366, Final Office Action dated May 19, 2016.
U.S. Appl. No. 14/289,231, Final Office Action dated May 19, 2016.
U.S. Appl. No. 14/292,296, Office Action dated May 27, 2016.
U.S. Appl. No. 14/316,517, Office Action dated May 19, 2016.
U.S. Appl. No. 14/315,874, Final Office Action dated Jun. 17, 2016.

\* cited by examiner

CLOUD COMPUTING ABSTRACTION LAYER FOR INTEGRATING MOBILE PLATFORMS

BACKGROUND

Online computing resources are used in a wide range of industries to provide software and infrastructure to users via networks, such as the Internet. Accessing such computing resources via the Internet is commonly referred to as "cloud" computing. In cloud computing, large numbers of computers are connected through various communications networks in order to provide information services, such as virtualized data centers, to users around the world.

Information technology (IT) professionals commonly manage cloud computing resources using advanced management software, such as vCloud® Automation Center™ from VMware, Inc. Such management software typically provides a secure portal where authorized administrators, developers, and business users can request new IT services and perform management operations, such as provisioning and configuration tasks. For example, an authorized user may log into a cloud computing manager to browse a catalog of IT services, such as infrastructure, applications, desktops, etc., and submit a request for such services. In response, the management software may provision the requested IT services, allowing the user to easily deploy and scale cloud resources for various online applications.

Although cloud computing management software generally provides powerful tools for provisioning and managing IT services, the management software is typically configured as an internal application running within a secure server. As such, authorized users typically must access the management software via a secure connection, such as a local area connection (LAN) or virtual private network (VPN). In addition, management software is typically designed to be accessed via a conventional terminal, such a desktop computer or laptop computer that includes a mouse and keyboard. Consequently, although mobile devices, such as tablets and smartphones, provide secure connections, cloud computing management interfaces typically are not designed for use on such devices. Thus, enabling management software to be controlled using a mobile device typically requires custom software to be developed for multiple smartphone and tablet platforms (e.g., Android™, iOS™, Windows Phone™, etc.).

Accordingly, there are challenges faced by system administrators when attempting to manage cloud computing resources using a mobile device.

SUMMARY

One or more embodiments of the present disclosure provide a system for managing a virtualized computing system using a mobile device. The system enables a user of a mobile device to efficiently track and manage computing resources via a management application that includes a graphical user interface that is designed to be operated using a conventional terminal (e.g., via a mouse and keyboard). The system may receive commands from the user of the mobile device in a first format and translate the commands into a second format that can be executed by a management application. Embodiments of the present disclosure further enable a management application to verify and securely communicate with users via existing communications services (e.g., social networking services) without expending additional resources to develop custom, secure interfaces for multiple mobile software and hardware platforms.

A method of processing commands for a management application that manages a virtualized computing system includes, in an embodiment, determining that a communications service account associated with a communications service corresponds to an authorized user account associated with the management application and receiving a first message from the communications service account via the communications service. The first message includes one or more commands for managing the virtualized computing system. The one or more commands are formatted according to a first format. The method further includes parsing the first message to extract the one or more commands, translating the one or more commands from the first format to a second format that is executable by the management application, and, based on determining that the communications service account corresponds to the authorized user account, causing the management application to execute the one or more commands.

A non-transitory computer-readable storage medium comprising instructions that, when executed in a computing device, process commands for a management application that manages a virtualized computing system, by performing the steps of, in an embodiment, determining that a communications service account associated with a communications service corresponds to an authorized user account associated with the management application and receiving a first message from the communications service account via the communications service. The first message includes one or more commands for managing the virtualized computing system. The one or more commands are formatted according to a first format. The non-transitory computer-readable storage medium further includes instructions for parsing the first message to extract the one or more commands, translating the one or more commands from the first format to a second format that is executable by the management application, and, based on determining that the communications service account corresponds to the authorized user account, causing the management application to execute the one or more commands.

A computer system for processing commands for a management application that manages a virtualized computing system, the computer system including a system memory and a processor programmed to carry out the steps of, in an embodiment, determining that a communications service account associated with a communications service corresponds to an authorized user account associated with the management application and receiving a first message from the communications service account via the communications service. The first message includes one or more commands for managing the virtualized computing system. The one or more commands are formatted according to a first format. The system memory and processor are further programmed to carry out the steps of parsing the first message to extract the one or more commands, translating the one or more commands from the first format to a second format that is executable by the management application, and, based on determining that the communications service account corresponds to the authorized user account, causing the management application to execute the one or more commands.

DETAILED DESCRIPTION

Figure 1:
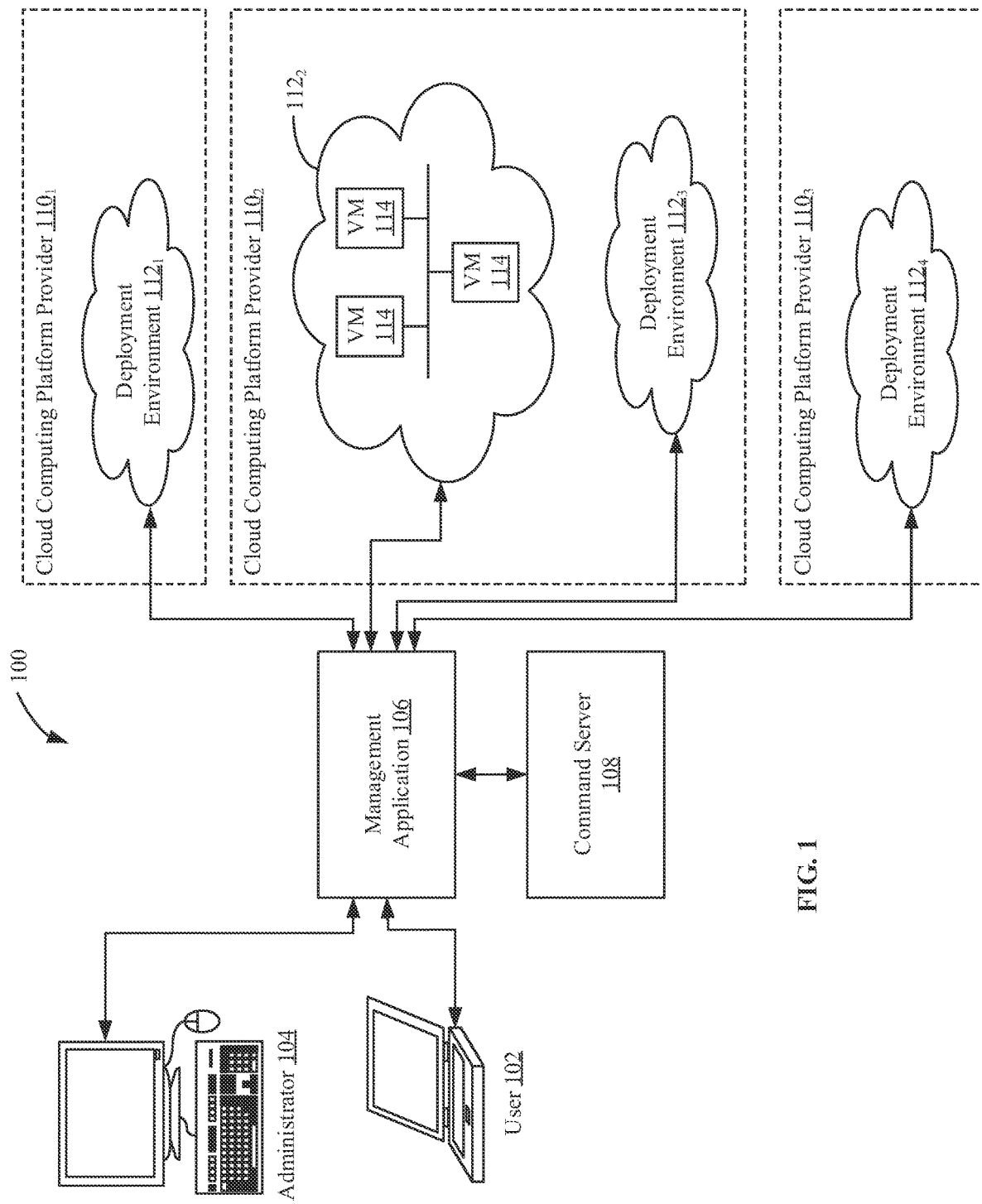
FIG. 1 depicts one embodiment of a system for managing a deployment within one or more cloud computing environments.

FIG. 1 depicts one embodiment of a system for managing a deployment within one or more cloud computing environments. In this embodiment, an application created by a user 102 may be deployed in deployment environments $112_1$, $112_2$, $112_3$ and $112_4$ (collectively "deployment environments 112") provided by cloud computing platform providers $110_1$, $110_2$ and $110_3$ (collectively "cloud computing platform providers 110," sometimes referred to simply as "cloud providers"). As depicted in FIG. 1, each cloud computing platform provider 110 may provide one or more deployment environments 112, for example, for development, testing, staging, and production of the application. Each deployment environment 112 may include one or more host computers that are organized into one or more clusters. The host computers (also referred to as "servers") may include conventional components of a computing device, such as memory, a processor, a disk interface, and a network interface and may be configured to support a virtualized environment to deliver one or more application services related to information technology, including but not limited to, web services, database services, data processing services, and directory services. Each host computer provides a virtualization layer that abstracts processor, memory, storage, and/or networking resources into multiple virtual machines (VMs) 114 that run concurrently on the same host computer.

Management application 106 is a computer program that resides and executes in a central server or, alternatively, runs on a VM in a host computer. Management application 106 is in communication with each cloud computing platform provider 110 and carries out administrative tasks with respect to each deployment environment 112 including, but not limited to, maintaining a catalog of services offered by cloud computing platform providers 110, requesting and tracking services provisioned from cloud computing platform providers 110, managing VMs 114 running within host computers of deployment environments 112, and so on. For example, user 102 may request and manage services provided by cloud computing platform providers 110 via management application 106, for example, using a REST (Representational State Transfer) API (Application Programming Interface) or any other client-server communication protocol. In response to requests and commands submitted by user 102 via management application 106, cloud computing platform providers 110 provision and modify virtual computing resources (e.g., VMs 114) to manage the deployment environments 112 in which user 102 has deployed its multi-tier application. One example of such a management application 106 is vCloud Automation Center available from VMware, Inc.

As described above, management application 106 may maintain a catalog of available services (e.g., virtual computing resources, such as VMs, networking, storage, etc.) that may be provisioned from cloud computing platform providers 110 and available application components (e.g., software services, scripts, code components, application-specific packages) that may be installed on the provisioned virtual computing resources. Once an application has been deployed, management application 106 may further be used to track and manage services provisioned from one or more cloud computing platform providers 110. In some embodiments, management application 106 may provision services from cloud computing platform providers 110 based on blueprints, which specify deployment settings (e.g., virtual computing resources' cluster size, CPU, memory, networks) and utilize services included in the catalog. For example, when user 102 submits a request for services to management application 106 based on a blueprint, management application 106 requests services from cloud computing platform providers 110 based on the structure specified by the blueprint.

Management application 106 may perform administrative tasks for the virtualized computing system 100 autonomously, or may perform administrative tasks in response to one or more commands issued by user 102 or administrator 104. In general, administrator 104 may customize, configure, and manage application 106, such as by creating and managing services and blueprints included in the catalog and creating and configuring different user identities. User 102 and administrator 104 may access the management application 106 using a terminal that is connected to management application 106 via a local area network (LAN) connection or a wide area network (WAN) connection. The connection may be secured using a Virtual Private Network (VPN) or other suitable means. The terminal may be any computing device that includes conventional components, such as a processor, memory, storage, and network interface. To support a direct interface with the management application 106, the terminal may include a software application that produces a graphical user interface or a command-line interface.

As described above, management application 106 may include an interface that is designed for use with conventional input devices, such as a mouse and keyboard. As such, although use of a mobile device, such as a smartphone or tablet computer, is a convenient means of communication when a user is out of the office, such devices may be poorly suited for interacting with management application 106, for example, to track and manage services provisioned from cloud providers. Further, as new mobile devices proliferate and implement a variety of hardware and software platforms, it becomes challenging to implement and maintain administrative and user clients that are compatible with the variety of hardware and software platforms available in the marketplace.

Abstraction Layer for Integrating Mobile Platforms

To address these and other shortcomings, a command server 108 may be implemented to receive and interpret command messages transmitted by a user of a mobile device (e.g., user 102 or administrator 104) via a third-party communications service, such as a social networking service. Command server 108 may receive the command messages via an API provided by the third-party communications service or by monitoring a designated account on the communications service associated with management application 106. Command server 108 then transmits the interpreted commands to management application 106 in accordance with an API (e.g., a REST API) specified by management application 106. Accordingly, a user of a mobile device may interact with management application 106, for example, to track and request services provisioned from one or more cloud providers, when the user does not have access to a conventional terminal Such techniques are described below in further detail in conjunction with FIGS. 2-4.

Figure 2:
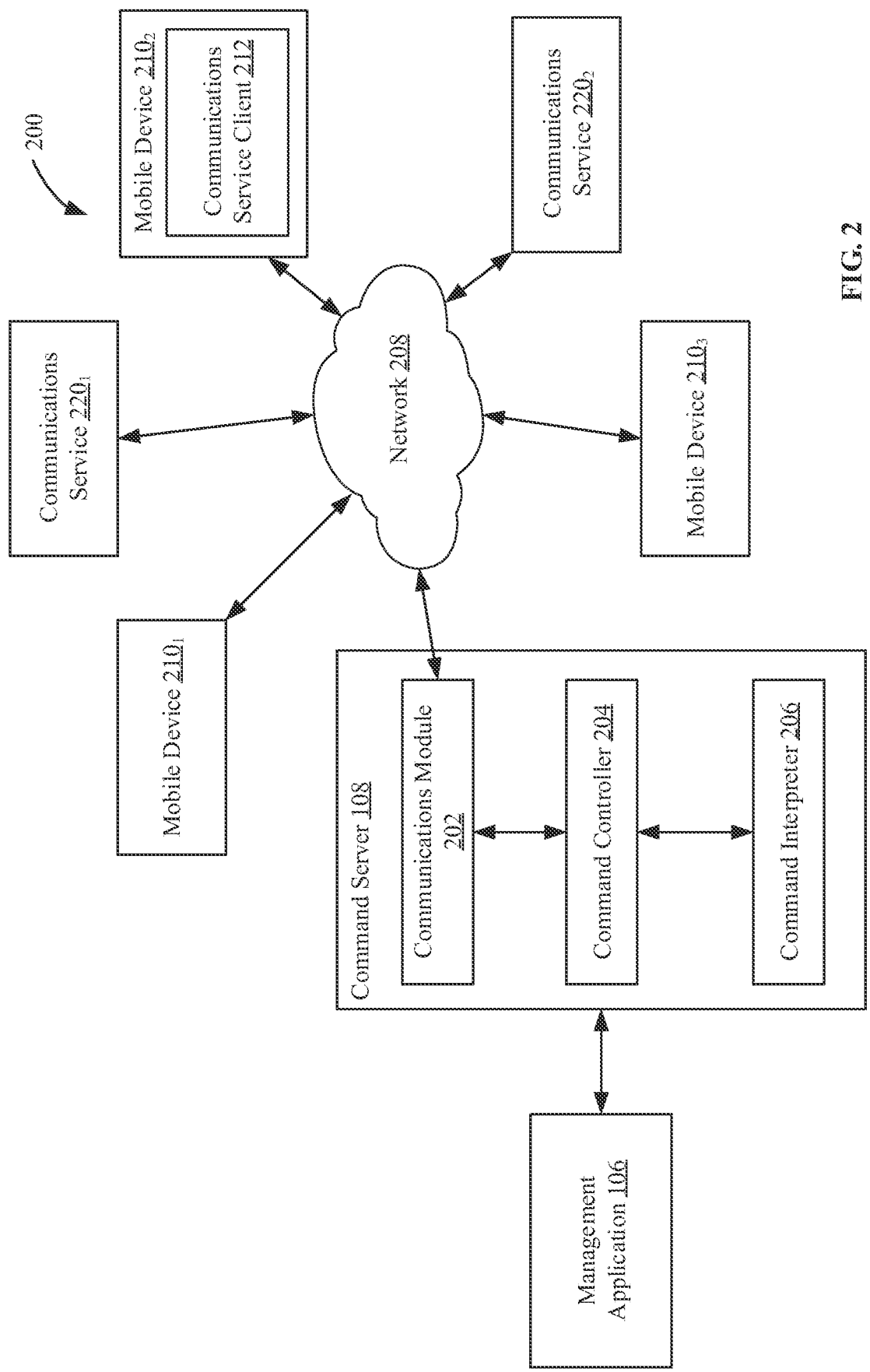
FIG. 2 is a block diagram that illustrates a system for implementing a method for managing virtualized computing system of FIG. 1 via a communications service utilizing a command server, according to one embodiment of the present invention.

FIG. 2 is a block diagram that illustrates a system 200 for implementing a method for managing virtualized computing system 100 of FIG. 1 via a communications service utilizing command server 108, according to one embodiment of the present invention. As shown, the system 200 includes command server 108 communicatively coupled to management application 106 of FIG. 1, a plurality of mobile devices $210_1$, $210_2$ and $210_3$ (collectively "mobile devices 210"), and communications services $220_1$ and $220_2$ (collectively "communications services 220"), each connected to a communications network 208. Mobile devices 210 are configured to be operable by user 102, administrator 104, or other suitable users to communicate with the management application 106. Mobile devices 210 may be smartphones, tablet computing devices, personal digital assistants (PDAs), or other suitable computing devices that are portable and configured for wireless connectivity with a network, such as the network 208. While exemplary mobile devices 210 are described in detail herein, it should be understood that other mobile devices having similar or different elements and configurations may be used in various embodiments of the disclosure. Further, for clarity of discussion, it is understood that a user, such as user 102 or administrator 104, may be operating a mobile device (e.g., mobile device $210_1$) and that the user and the mobile device may be referred to interchangeably.

According to some embodiments, one or more communications services 220 may communicate with each mobile device 210 via a communications service client 212, which may be configured to transmit messages to, and receive messages from, communications services 220. In some embodiments, communications service client 212 is a software application (e.g., a dedicated mobile application, or "app") configured to generate, transmit, receive, retrieve, and/or display messages and status updates associated with one or more communications services 220 via messaging techniques known in the art, including push notifications and private messaging. Alternatively, communications service client 212 may be a software application configured to provide access to communications services 220, such as via a web browser. Some examples of communications services 220 with which the communications service client 212 may interact include social networking services, such as Facebook®, Twitter®, Google+®, WhatsApp®, and LinkedIn®.

Communications service client 212 may be configured to transmit command messages to a particular communications service account associated with command server 108 (herein referred to as a "command server account"). The command messages may include one or more commands for management application 106 to perform administrative procedures and management tasks on virtualized computing system 100. The command server account may be established (e.g., by an administrator) via mechanisms for user account creation provided by communication services 212. In some embodiments, command server 108 is configured to store authentication credentials, such as username (e.g., "CommandServer1") and a password associated with the command server account. Command server 108 may use the authentication credentials when accessing communications service 220, as described below.

In some embodiments, command server 108 is configured to access communications server 220 and retrieve a command message that includes one or more commands and/or specifies one or more command server accounts to which the one or more commands are directed. Command server 108 may receive a command message having a message body containing one or more commands formatted according to a syntax specified by a communications service 220 or by command server 108. In one specific example, if communications service $220_1$ is the Twitter® social networking service, then a command message may be formatted such that commands are preceded by a symbol, such as a hash symbol (i.e., "#"), in accordance with the syntax specified by Twitter®. For example, user 102 may transmit a command message that includes the command "#ListItems" to a command server account (e.g., via a private message) using Twitter® in order to receive a listing of services that can be requested from one or more cloud providers. Further, the identities of the one or more command server accounts for which commands are intended may be preceded by a symbol, such as the "@" symbol, in accordance with the syntax specified by Twitter®. For example, if user 102 wishes to receive a listing of services from management application 106, the command message may include a mention of a name of the command server account associated with management application 106, such as by specifying "@CommandServer1" in the command message. Accordingly, if user 102 wishes to request a listing of available services from Command Server 1, a command message that complies with the Twitter® syntax may include the text string "@CommandServer1 #ListItems." Alternatively, if a command message is sent as a direct message or a private message that is directed at one or more specific command server accounts, the text of the command message itself may not need to specify the account(s) at which the commands are directed. Although the examples included above provide specific examples with regards to the Twitter® social networking service, similar techniques and/or syntax may be utilized with other communications services 220. For example, similar syntax (e.g., symbol usage) may be used when transmitting command messages via Facebook® or LinkedIn®.

To enable acceptance of commands from a particular user (e.g., user 102 or administrator 104), command server 108 may first establish a trusted relationship with a user of the communications service client 212. Management application 106 maintains a database of authorized users, as well as permissions associated with each authorized user. In some embodiments, management application 106 and/or command server 108 may associate each authorized user included in a database with the authorized user's corresponding communications service 220 account(s). For example, a database entry associated with a particular authorized user of management application 106 may be linked to that user's Twitter® account, Facebook® account, etc. Then, a trusted relationship between command server 108 and a communications service client 212 may be established via the communications service 220, such as by requiring the user to log into the Twitter® or Facebook® account that is linked to the user's database entry. Command server 108 may then grant permissions to the user in accordance with the user's database entry. In the same or other embodiments, command server 108 may add one or more accounts associated with an authorized user to a list of trusted contacts maintained by the command server 108, management application 106, and/or communications service 220. For example, if communications service $220_1$ is the Twitter® social networking service, then a trusted relationship may be established when a user "follows" a particular command server account, and the command server account approves and/or "follows" the user's account in return, thus, adding the user's account to a list of trusted contacts. In another example, if communications service $220_1$ is the Facebook® or Google+® social networking services, then a trusted relationship may be established when a user requests that a particular command server account be added to a list of "friends" or to a particular contact "circle," and the command server account accepts or otherwise reciprocates the user's request. Similar procedures may be used for establishing a trusted relationship with a user via other communications services 220, such as LinkedIn. Advantageously, such techniques for establishing a trusted relationship between a user of a mobile device 210 and command server 108 may reduce the complexity of verification services that need to be developed and implemented for user 102 and administrator 104 to securely interact with management application 106. That is, such techniques take advantage of existing, proven network infrastructure to verify the identities of users and provide secure communications between the users.

Command server 108 is configured to receive command messages via communications module 202 and process the command messages to generate instructions executable by management application 106. Management application 106 further includes a command controller 204 for processing the command messages to extract one or more commands and a command interpreter 206 for generating instructions executable by management application 106 based on the extracted commands.

In one embodiment, communications module 202 of management application 106 is configured to communicate with one or more communications services 220 via network 208 to transmit, receive, and/or retrieve messages directed at a command server account associated with command server 108 (e.g., "Command Server 1"). Communications module 202 connects to a communications service 220 and fetches command messages that are directed at the command server account, such as by submitting a username and password associated with the command server account. Communications module 202 may be configured to monitor a communications service 220 at a user-configurable periodicity to send and/or receive messages. For example, communications module 202 may be configured to check for private messages sent to the command server account, messages posted on the profile "timeline" of the command server account or a user account (e.g., via Facebook®), "mentions" of a command server account (e.g., via Twitter®) at different periodicities, etc. every minute, every five minutes, etc. In some embodiments, communications module 202 is configured to support a "push message" protocol (e.g., the Twitter® push message protocol), such that command messages—or notifications associated with the command messages—are actively transferred (i.e., pushed) from communications services 220 to the communications module 202 as the command messages arrive at communications services 220.

In some embodiments, communications module 202 is configured to generate messages containing output (e.g., current configuration parameters of a virtual machine 114, deployment environment 112, etc.) received from management application 106 and directed to one or more users responsible for management application 106, such as a user, tenant administrator, or system administrator. In some embodiments, communications module 202 generates and transmits an alert message (sometimes referred to as an "alert") that notifies user 102 or administrator 104 of a condition in management application 106 (e.g., system running low on memory). In the same or other embodiments, communications module 202 generates a status message containing output from management application 106 in response to a specific command received from user 102 or administrator 104. For example, communications module 202 may send a status message indicating the virtual computing resource usage associated with a cloud provider in response to receiving a command requesting "status" and/or in response to a request from a user to provision additional resources from a cloud provider. In yet another example, a status message may be generated that contains a verbose output indicating a successful or unsuccessful execution of a particular command included in a command message.

Command controller 204 is configured to invoke command interpreter 206 to communicate with the management application 106 and enable management application 106 to execute commands extracted from the command message. Command interpreter 206 is configured to transmit commands to management application 106 and/or receive output resultant from the transmitted commands or otherwise unsolicited status output from management application 106. For example, command interpreter 206 may receive output from management application 106 and translate or otherwise convert the output into a format that is more easily understood by a user and/or a format that complies with the requirements of a communications service 220. For example, output from management application 106 may be converted into a format that adheres to the 140 character limit imposed by Twitter® on each individual message. The translated output may then be transmitted to the user via communications module 202.

In some embodiments, command interpreter 206 contains a mapping of the syntax for command messages to corresponding REST API calls provided by management application 106. For example, command interpreter 206 may translate a command message of "#deploy <item>" to a corresponding REST API call to the resource http://example/deploy/ with an accompanying parameter (e.g., <item>). In other embodiments, command interpreter 206 is a command-line interpreter (CLI) that allows a user to express commands in a simple language (i.e., syntax) and execute those commands on management application 106, rather than via a graphical user interface. The CLI may be a software layer that translates one or more commands into instructions in a format that is understood and executable by management application 106. Examples of command interpreters that are suitable for implementing embodiments of the invention include PowerCLI or PERL SDK for vCloud Automation Center available from VMware, Inc., or one of a variety of other suitable command-line interpreter systems.

Figure 3:
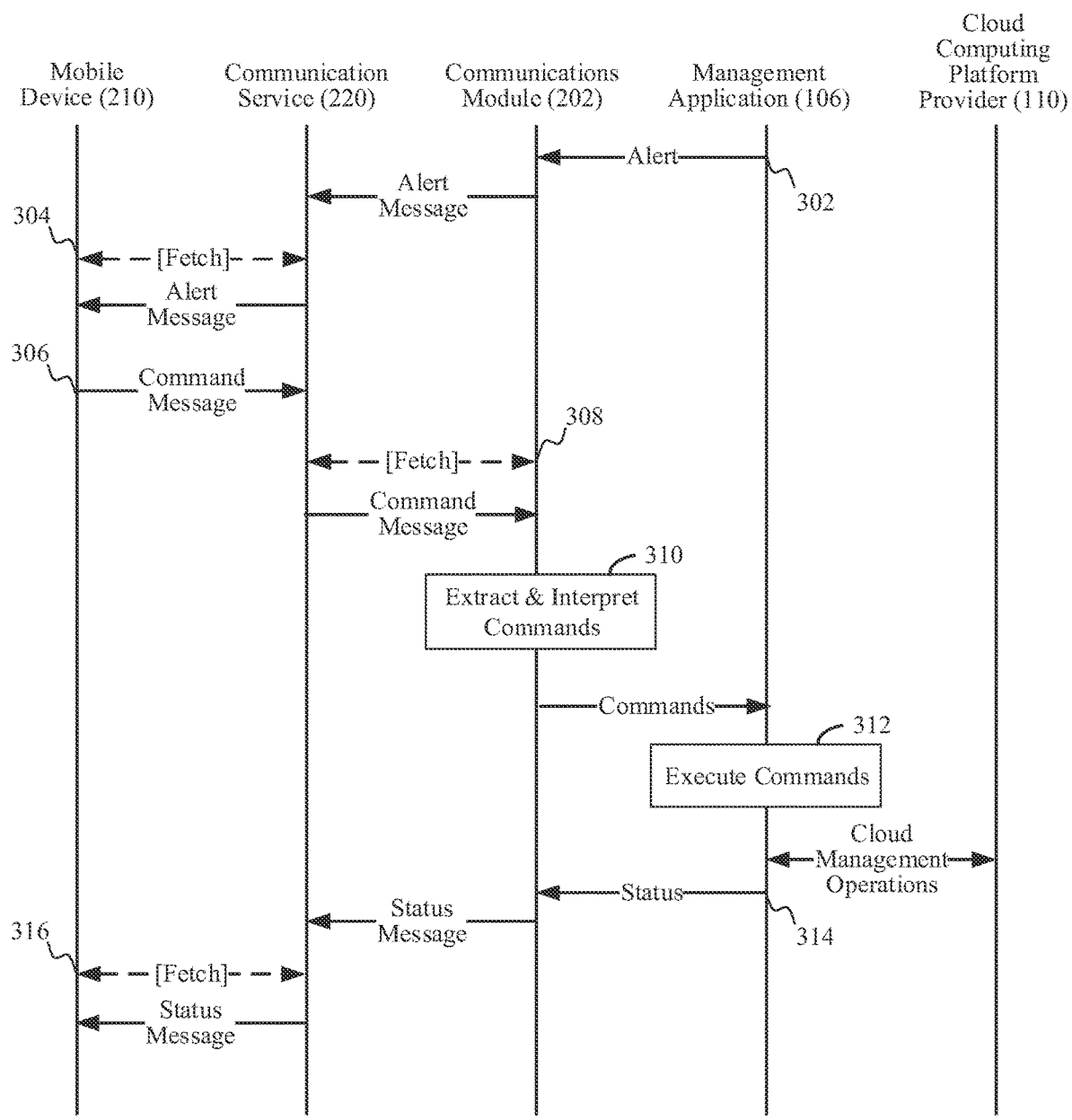
FIG. 3 is a sequence diagram that illustrates example operations for managing a virtualized environment via a communications service, according to one embodiment of the present invention.

The operations of system 200 are shown in FIG. 3. FIG. 3 is a sequence diagram that illustrates example operations for managing a virtualized environment via a communications service, according to one embodiment of the present invention. While the example operations are depicted as being performed by the system 200 of FIG. 2, it is contemplated that embodiments of the invention may be performed by other suitable systems.

At step 302, command server 108 receives a notification from management application 106 that a particular condition (referred to herein as an "alert condition") has been detected for virtualized computing system 100. For example, command server 108 may receive a notification that one or more VMs 114 in virtualized computing system 100 are over-provisioned, are experiencing overload, and/or are unresponsive. In response, command server 108 notifies user 102 and/or administrator 104 of the alert condition, such as by transmitting a status message to user 102 and/or administrator 104 via a communications service 220.

In one embodiment, responsive to detecting an alert condition, communications module 202 of command server 108 generates an alert message for one or more users designated as contacts for such alert messages. The communications module 202 of command server 108 connects to one or more communications services 220 and transmits the alert message.

As described above, messages transmitted to and from command server 108 and a user may include commands and indicate target account(s) (e.g., a communications service 220 account, command server account, or other account identities) using optional symbols, in accordance with a syntax defined by the command server 108 and/or a particular communications service 220. For example, communications module 202 may generate a status message or alert message that includes a communications service account (e.g., "User 1," "@User1," etc.) for which the message is intended.

One example of a Twitter® alert message to user 102, having communications service account "User 1," may appear as follows:

@User1 Host Computer ALPHA at 192.168.0.123 has CPU Load of 99% for a time period exceeding 1 hour(s).

At some time later, at step 304, communications service client 212 of mobile device 210 connects to communications service 220 and fetches or receives messages, including the alert message, addressed to user 102. At some time later, user 102 may read the alert message and decide to respond to the alert message with instructions for the management application 106 to perform one or more actions to ameliorate the alert condition.

At step 306, user 102 composes a command message from a mobile device 220 that is directed to the command server account. The body of the command message includes one or more commands formatted according to a syntax accepted by command server 108. As described above, commands may be designated and/or separated by a symbol or delimiter, such as a hash symbol, a carriage return, a newline (i.e., each command on a separate line), or a blank line. Commands may be arranged in the command message according to a sequence in which the commands are to be executed by management application 106.

For example, as described above, user 102 may request a listing of available services from Command Server 1. As such, user 102 may compose a command message addressed to the appropriate command server account (e.g., "Command Server 1") and having the command "#ListItems" in the command message body. An example of a Twitter® command message may appear as follows:

@CommandServer1 #ListItems

Other exemplary commands that may be issued to and executed by management application 106 include "#deploy <item>," which deploys a particular item included in a catalog, "#destroy <my.item>," which destroys a particular item that was previously deployed by the user, "#ScaleOut <item> <N>" and "#ScaleIn <item> <N>," which modify the scale (e.g., number of applications and/or computing resources) of a deployment by N amount of resources, and "#MyDeployments," which returns a listing of the user's current applications.

At step 308, command server 108 contacts communications service $220_1$ and fetches or receives any messages directed at the command server account, including the command message sent at step 306.

At step 310, command server 108 extracts one or more commands from the command message. Command interpreter 206 then interprets the commands to generate one or more instructions in a format executable by management application 106. In some embodiments, a command message includes commands written in accordance with a first format, and command interpreter 206 translates the commands from the first format to a second format, such as a format that adheres to a syntax specified by management application 106. For example, command interpreter 206 may translate the command #ListItems, which is written in a first format, to a second format that is executable by management application 106, such as "List.Items-catalog." Additionally, in some embodiments, the format into which commands are translated by command interpreter 206 may include API calls (e.g., REST API calls) associated with management application 106. Command interpreter 206 then relays the instructions to management application 106 for execution.

At step 312, management application 106 executes the instructions to perform one or more operations on cloud computing platform providers 110 included in virtualized computing system 100.

At step 314, after the instructions have been executed, status output messages may be returned by management application 106 to command server 108. Command server 108 then generates one or more status messages that include the contents of the status output messages and transmits the status message(s) to user 102 via communication service $220_1$. For example, in embodiments in which communications service $220_1$ is Twitter®, a status message may be transmitted to user 102 as a reply to the command message (e.g., "tweet") initially submitted by user 102.

The output messages may include textual and/or multimedia data. In some embodiments, instead of including text and/or a graphical description to describe the alert, status, etc. in the message itself, the message may include a link, such as a uniform resource locator (URL), that the user can follow to view the text and/or graphical description. For example, if a status message contains too many characters to be sent via a particular communications service 220 (e.g., more than 140 characters when sent via Twitter®), the text of the message may be stored on a server (e.g., a "pastebin"), and a URL to the location of the pastebin may be provided to the user in the message body. Alternatively, if a status message contains too many characters to be sent via a particular communications service 220, the text may be split between multiple messages, and the messages may be transmitted to the user.

Figure 4:
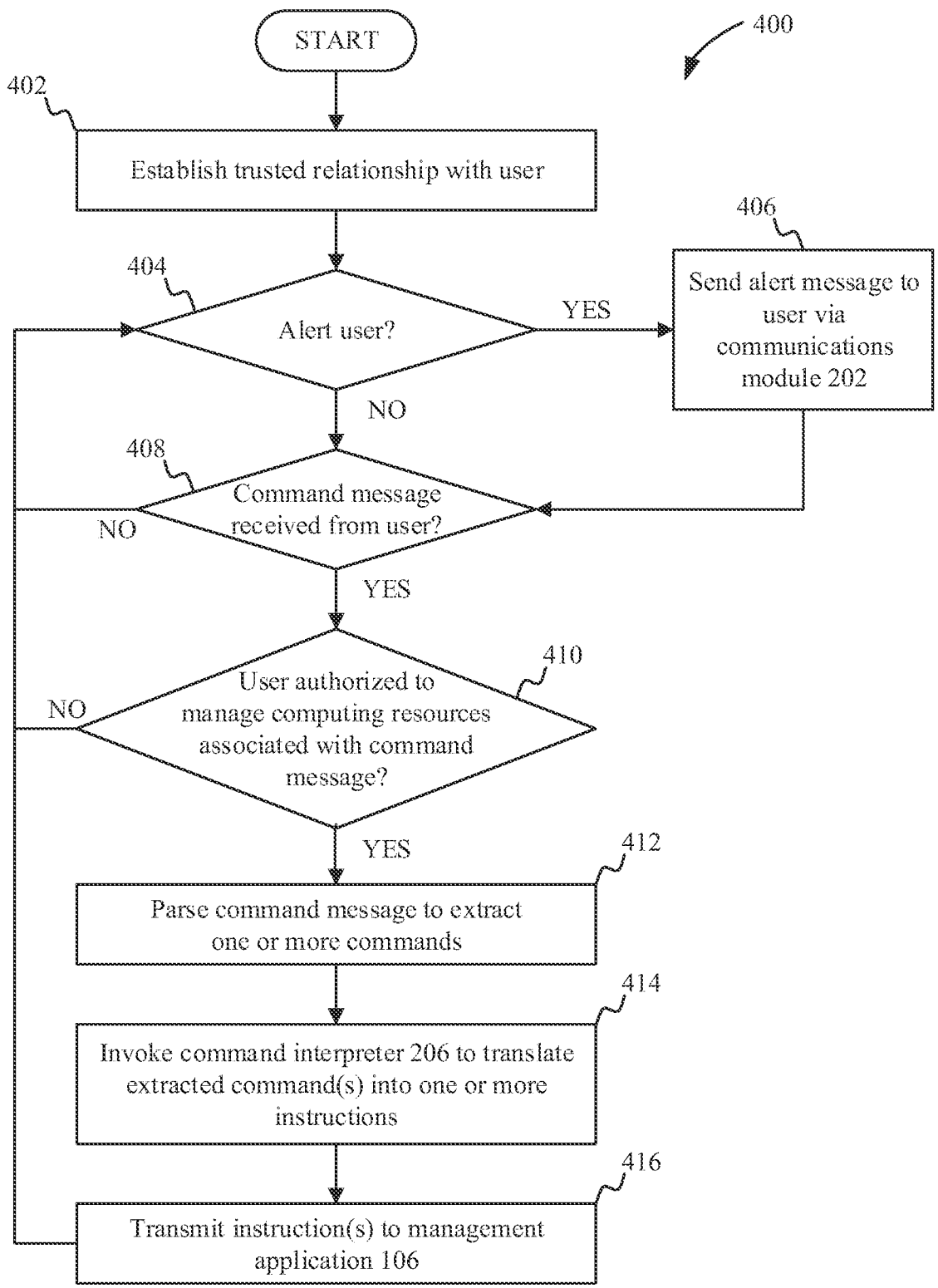
FIG. 4 is a flow diagram of an exemplary method performed by command server to manage virtualized computing system.

FIG. 4 is a flow diagram of an exemplary method 400 performed by command server 108 to manage virtualized computing system 100. It should be recognized that, even though the method 400 is described in conjunction with the systems of FIGS. 1-3, any system configured to perform the method steps is within the scope of embodiments of the disclosure.

The method 400 begin at step 402, where command server 108 establishes a trusted relationship with a user (e.g., user 102 or administrator 104), such as via one or more communication services 220 (e.g., a social networking service). In some embodiments, establishing a trust relationship with a user may include determining which computing resources (e.g., virtual computing resources) the user is authorized to manage.

At step 404, command server 108 determines whether an alert associated with the user (e.g., an alert associated with virtual computing resources the user is authorized to manage) has been received by management application 106. If an alert has been received, then, at step 406, communications module 202 included in command server 108 transmits an alert message to the user, for example, via one or more communication services 220. If no alert associated with the user has been received, then the method 400 proceeds to step 408.

At step 408, communications module 202 of command server 108 determines whether a command message has been received from the user. As described above, a user may post a command message intended for command server 108 to one or more communications services 220 using various messaging techniques, such as private messaging, profile "timeline" postings (e.g., via Facebook®), "mentions" (e.g., via Twitter®), and the like. Command server 108 may then retrieve the command message, for example, by monitoring communications posted on the one or more communications services 220 or receive the command message, for example, via push notification. If communications module 202 determines that there are no new command messages transmitted by the user, the method 400 returns to step 404. If communications module 202 determines that a new command message directed to the command server account has been transmitted by the user, then communications module 202 transmits the command message to command controller 204, and method 400 proceeds to step 410.

At step 410, command controller 204 of command server 108 receives a command message containing one or more commands for managing virtualized computing system 100. Command server 108 then optionally determines whether the user is authorized to manage the computing resources (e.g., a particular application deployment, deployment environment 112, cloud computing platform provider 114, etc.) identified in, or otherwise associated with, the command message. In some embodiments, command server 108 determines whether a communications service 220 account of a user is linked to an authorized user database entry stored by management application 106, as described above. For example, command server 108 may reference a database of authorized users and user permissions to determine whether the user is authorized to submit and execute the one or more administrative commands contained in the command message for management application 106. According to some embodiments, a plurality of users may be granted specific roles and permissions for operating management application 106. For example, one user may be designated as a system administrator for a particular data cluster, a particular host computer, and/or for a virtual machine executing on one or more host computers. It is appreciated that responsibilities for specific virtualized computer inventory components, such as resource pools, can be delegated based on business organization or ownership. Additionally, in some embodiments, rather than entirely allow or disallow a command message based on roles and permission, command server 108 may determine that the command message from a user requires further approval from a supervisor user. Users may be assigned supervisory-subordinate relationships such that a supervising user may have to review and authorize a command and/or operation submitted by a subordinate user before the command server 108 will process submitted commands.

If command server 108 determines that user is authorized to manage the relevant computing resources, then the method 400 proceeds to step 412. If command server 108 determines that the user is not authorized to manage the relevant computing resources, then the method 400 returns to step 404.

At step 412, command server 108 parses the command message to extract one or more commands for management application 106. In some embodiments, command server 108 may perform a preliminary syntax check of the contents of the command message. Material in the command message that is not a valid command may be disregarded, flagged, and/or processed separately. Command server 108 may then place the extracted commands into temporary storage, for example, such as in a queue. For example, in embodiments that implement a Twitter® client to communicate with communications service $220_1$, Twitter® messages received by or otherwise directed to the command server account may be parsed to determine whether the messages contain any valid commands. Messages (e.g., "tweets") that contain valid commands that adhere to the relevant syntax may be flagged and/or immediately processed by command server 108. Messages that do not contain valid commands may be disregarded. Similar techniques for parsing messages may be applied to messages received through other communications services 220, such as Facebook® and Google+®.

At step 414, command server 108 invokes command interpreter 206 to translate the extracted commands from a first format to one or more instructions in a second format executable by management application 106. At step 416, command interpreter 206 transmits the instructions to management application 106. The method 400 then returns to step 404.

After the instructions have been executed, management application 106 may provide a summary of the actions taken and the post-execution status of the resources affected by the commands. The summary and status may be transmitted by management application 106 as an alert message and/or status message, which may be detected by command server 108 at step 404. Then, at step 406, communications module 202 may transmit the alert message and/or status message to the user via one or more communications services 220. Command server 108 may then continue to determine whether an alert has been received from management application 106 or whether a command message has been received from a user at steps 404 and 408, respectively, until operation of the command server 108 is terminated.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, while embodiments herein have referred to certain types of communications services 220 and methods of transmitting messages between users of communications services 220, it should be recognized that other types of communication services 220 and messaging techniques may be utilized in alternative embodiments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of processing commands for a management application that manages a virtualized computing system comprising a plurality of physical host computers executing one or more virtual machines (VMs), comprising:
   determining that a communications service account associated with a communications service corresponds to an authorized user account associated with the management application;
   receiving a first message from the communications service account via the communications service, the first message comprising a first command for managing the virtualized computing system, the first command formatted according to a first syntax corresponding to the communications service, and not executable by the management application;
   parsing the first message to extract the first command;
   determining that the first command is a valid command;
   determining a first format of the first command;
   translating the first command from the first format to a second command in a second format that is executable by the management application;
   transmitting the second command in the second format to the management application, causing the management application to execute the second command;
   receiving a response from the management application based on the second command,
   determining the communications service corresponding to the response;
   associating, with a uniform resource locator (URL), one or more configuration parameters of the virtualized computing system that were modified via the second command; and
   transmitting information including at least a portion of the response to the communications service account via the communications service, wherein the information comprises the URL.

2. The method of claim 1, wherein the communications service comprises a social networking service.

3. The method of claim 2, wherein receiving the first message via the communications service comprises monitoring and retrieving content posted by the communications service account on the social networking service.

4. The method of claim 2, further comprising establishing a trusted relationship with the communications service account based on determining that the communications service account corresponds to the authorized user account, and wherein receiving the first message from the communications service account is performed after establishing the trusted relationship.

5. The method of claim 1, further comprising accessing the authorized user account to determine whether the communications service account has permission to issue at least one type of command included in the first command.

6. The method of claim 1, wherein the first command included in the first message are indicated by a symbol associated with the first format.

7. The method of claim 1, further comprising updating a database entry associated with the authorized user account to include a social networking service account and permissions associated with the social networking service account.

8. A non-transitory computer-readable storage medium comprising instructions that, when executed in a computing device, process commands for a management application that manages a virtualized computing system comprising a plurality of physical host computers executing one or more virtual machines (VMs), by performing the steps of:
   determining that a communications service account associated with a communications service corresponds to an authorized user account associated with the management application;
   receiving a first message from the communications service account via the communications service, the first message comprising a first command for managing the virtualized computing system, the first command formatted according to a first syntax corresponding to the communications service, and not executable by the management application;
   parsing the first message to extract the first command
   determining that the first command is a valid command;
   determining a first format of the first command;
   translating the first command from the first format to a second command in a second format that is executable by the management application;

transmitting the second command to the management application, causing the management application to execute the second command;

receiving a response from the management application based on the second command, determining the communications service corresponding to the response;

associating, with a uniform resource locator (URL), one or more configuration parameters of the virtualized computing system that were modified via the second command; and transmitting information including at least a portion of the response to the communications service account via the communications service, wherein the information comprises the URL.

9. The non-transitory computer-readable storage medium of claim 8, wherein the communications service comprises a social networking service.

10. The non-transitory computer-readable storage medium of claim 9, wherein receiving the first message via the communications service comprises monitoring and retrieving content posted by the communications service account on the social networking service.

11. The non-transitory computer-readable storage medium of claim 9, further comprising instructions that, when executed in the computing device, perform the step of establishing a trusted relationship with the communications service account based on determining that the communications service account corresponds to the authorized user account, and wherein receiving the first message from the communications service account is performed after establishing the trusted relationship.

12. The non-transitory computer-readable storage medium of claim 8, further comprising instructions that, when executed in the computing device, perform the step of accessing the authorized user account to determine whether the communications service account has permission to issue at least one type of command included in the first command.

13. The non-transitory computer-readable storage medium of claim 8, wherein the first command included in the first message are indicated by a symbol associated with the first format.

14. The non-transitory computer-readable storage medium of claim 8, further comprising instructions that, when executed in the computing device, perform the step of updating a database entry associated with the authorized user account to include a social networking service account and permissions associated with the social networking service account.

15. A computer system for processing commands for a management application that manages a virtualized computing system comprising a plurality of physical host computers executing one or more virtual machines (VMs), the computer system comprising a system memory and a processor programmed to carry out the steps of:

determining that a communications service account associated with a communications service corresponds to an authorized user account associated with the management application;

receiving a first message from the communications service account via the communications service, the first message comprising a first command for managing the virtualized computing system, the first command formatted according to a first syntax corresponding to the communications service, and not executable by the management application;

parsing the first message to extract the first command determining a first format of the first command;

determining that the first command is a valid command;

translating the first command from the first format to a second command in a second format that is executable by the management application;

transmitting the second command in the second format to the management application, causing the management application to execute the second command;

receiving a response from the management application based on the second command, determining the communications service corresponding to the response;

associating, with a uniform resource locator (URL), one or more configuration parameters of the virtualized computing system that were modified via the second command; and transmitting information including at least a portion of the response to the communications service account via the communications service, wherein the information comprises the URL.

16. The computer system of claim 15, wherein the communications service comprises a social networking service.

\* \* \* \* \*